US012704599B2

(12) United States Patent
Groening et al.

(10) Patent No.: US 12,704,599 B2
(45) Date of Patent: Aug. 11, 2026

(54) LIDAR SENSOR

(71) Applicant: Robert Bosch GmbH, Stuttgart (DE)

(72) Inventors: Albert Groening, Stuttgart (DE); Andre Albuquerque, Penalva do Castelo (PT); Frederik Ante, Lampertheim (DE); Stefan Spiessberger, Weinstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 845 days.

(21) Appl. No.: 18/155,870

(22) Filed: Jan. 18, 2023

(65) Prior Publication Data

US 2023/0228849 A1 Jul. 20, 2023

(30) Foreign Application Priority Data

Jan. 20, 2022 (DE) ..................... 10 2022 200 594.5

(51) Int. Cl.
*G01S 7/481* (2006.01)
*G01S 17/894* (2020.01)
*G02B 27/09* (2006.01)

(52) U.S. Cl.
CPC ............ *G01S 7/481* (2013.01); *G01S 17/894* (2020.01); *G02B 27/0961* (2013.01)

(58) Field of Classification Search
CPC ........ G02B 27/0172; G02B 2027/0178; G02B 27/0176; G02B 2027/014; G02B 2027/0138; G02B 27/0081; G02B 2027/0187; G02B 27/4205
USPC .............................................................. 356/4
See application file for complete search history.

(56) References Cited

FOREIGN PATENT DOCUMENTS

| | | | | |
|---|---|---|---|---|
| CN | 115508923 B | * | 3/2024 | ........... G02B 3/0006 |
| DE | 102019213827 A1 | | 3/2021 | |
| JP | 2788791 B2 | * | 8/1998 | ................ F21V 5/04 |
| JP | 2000047115 A | * | 2/2000 | |

(Continued)

OTHER PUBLICATIONS

Voelkel et al., "Laser Beam Homogenizing: Limitations and Constraints," Optical Systems Design, 2008, pp. 1-12. <https://www.researchgate.net/publication/241380053_Laser_Beam_Homogenizing_Limitations_and_Constraints> Downloaded Jan. 17, 2023.

*Primary Examiner* — Masum Billah
(74) *Attorney, Agent, or Firm* — NORTON ROSE FULBRIGHT US LLP

(57) ABSTRACT

A lidar sensor. The lidar sensor includes a light source and a fly eye lens arrangement having a first microlens arrangement and a second microlens arrangement. The first microlens arrangement comprises a plurality of identical first microlenses stacked along a first axis. The second microlens arrangement comprises a plurality of identical second microlenses stacked along a second axis. The fly-eye lens arrangement is configured to generate, based on a light generated by the light source, a scanning beam for scanning an environment of the lidar sensor. The scanning beam includes a first sub-beam generated by the first microlens arrangement and a second sub-beam generated by the second microlens arrangement. Predefined optical properties of the first microlens arrangement and predefined optical properties of the second microlens arrangement differ from one another in order to generate a scanning beam having a predefined light intensity distribution.

12 Claims, 7 Drawing Sheets

(56) References Cited

FOREIGN PATENT DOCUMENTS

| | | | | |
|---|---|---|---|---|
| JP | 2002182119 | A | * | 6/2002 |
| JP | 2008265130 | A | * | 11/2008 |
| WO | 2022009615 | A1 | | 1/2022 |

* cited by examiner

I1

I2

β /2

γ+α/2

γ

γ - α/2

I

-β /2

LIDAR SENSOR

CROSS REFERENCE

The present application claims the benefit under 35 U.S.C. § 119 of German Patent Application No. DE 10 2022 200 594.5 filed on Jan. 20, 2022, which is expressly incorporated herein by reference in its entirety.

FIELD

The present invention relates to a lidar sensor.

BACKGROUND INFORMATION

The related art provides lidar sensors which are used for environmental sensing and environmental detection in vehicles, etc., in order to generate a 3D point cloud representing the environment of the lidar sensors.

In this context, various technologies are used to generate a lidar sensor scanning beam used for environmental sensing, relating in particular to so-called "time of flight" and "continuous wave" methods.

In addition, various technologies are employed to deflect the scanning beam within the lidar sensors. Conventional in this context are, e.g., so-called macroscanners comprising a rotatable deflection unit or so-called microscanners that generate a deflection of the scanning beam, e.g., on the basis of micro mirrors or optical phase arrays, and the like.

Also used in the related art are various beam-forming optical elements, which form a light generated by the lidar sensors (in particular a laser light) in a suitable manner. For example, mapping lenses, line generator lenses (Powell lenses), cylindrical lenses, fly-eye lenses, etc. are employed for this purpose.

"Laser Beam Homogenizing: Limitations and Constraints", Reinhard Voelkel, Kenneth J. Weible, Optical Systems Design 19 Sep. 2008, describes a fly-eye beam homogenizer comprising two microlens arrangements. A first microlens arrangement is configured to generate multiple images of a light source and function as individual field stops, while the second microlens arrangement is configured to integrate the individual images and function as individual aperture stops.

SUMMARY

According to the present invention, a lidar sensor is provided, which is, e.g., a lidar sensor of a vehicle, and in particular a lidar sensor of an environment detection system of a vehicle, without thereby restricting the lidar sensor according to the invention to such a design or such an area of application.

According to an example embodiment of the present invention, the lidar sensor comprises a light source and a fly-eye lens arrangement having a first microlens arrangement and a second microlens arrangement. The light source is, e.g., designed on the basis of one or more laser diodes and/or a variant single light source. The light source is, e.g., designed as a one-dimensional arrangement of a plurality of single light sources or as a two-dimensional arrangement (e.g., a matrix arrangement) of a plurality of single light sources.

The fly-eye lens arrangement constructed from a plurality of individual microlenses essentially mimics a facet eye or a portion of a facet eye of a fly, wherein the fly-eye lens arrangement according to the present invention includes both one-dimensional arrangements and two-dimensional arrangements of the plurality of microlenses, with respective arrangements generally including both regular and non-regular arrangements.

Based on such a fly-eye lens arrangement, a particularly homogeneous illumination can be achieved in an environment of the lidar sensor, which essentially corresponds to a rectangular or "top hat" illumination. Illumination of the environment is understood in particular to mean illumination in the region of a remote field of the lidar sensor, which begins, for example, at a distance of several meters from a light exit opening of the lidar sensor and extends to a distance of 50 m, 100 m, 200 m, 300 m, or more from the light exit opening.

A further advantage of the fly lens arrangement may be that failure of one or more single light sources (e.g., one or more laser diodes) of a composite light source has essentially no impact on the homogeneity of the illumination in the environment, but only affects an overall light intensity, whereby a particularly high failure safety of a lidar sensor based on such a fly lens arrangement is achievable. The homogeneity of an exit light of the lidar sensor generated by the fly-eye lens arrangement also offers the advantage of increased eye safety, in particular in a near field region of the lidar sensor, which extends, e.g., from a light exit opening of the lidar sensor to a distance of several centimeters or meters relative to the light exit opening.

According to an example embodiment of the present invention, the first microlens arrangement comprises a plurality of identical first microlenses stacked along (and particularly advantageously on) a first axis, while the second microlens arrangement has a plurality of identical second microlenses stacked along (and particularly advantageously on) a second axis.

The fly-eye lens arrangement is configured to generate a scanning beam based on a light generated by the light source for scanning an environment of the lidar sensor, which scanning beam is composed of a first sub-beam generated by the first microlens arrangement and a second sub-beam generated by the second microlens arrangement, wherein predefined optical properties of the first microlens arrangement and predefined optical properties of the second microlens arrangement differ from one another in order to generate a scanning beam having a predefined light intensity distribution in the environment of the lidar sensor.

In this context, it should be noted that the optical properties can generally refer to any optical properties of the microlens arrangements which are suitable for generating the scanning beam and are accordingly not limited. Various optical properties can be determined by, e.g., different definitions of respective diameters (or thicknesses) and/or curvatures of the individual microlenses of the respective microlens arrangements.

Preferably, according to an example embodiment of the present invention, the predefined light intensity distribution to be generated is defined within a field of view of the lidar sensor in accordance with one or more "region of interest" (abbreviated as ROI). In other words, the predefined light intensity distribution is to ensure that particularly interesting or critical areas in the environment of the lidar sensor are illuminated or scanned at a higher light intensity in order to achieve with the aid of this higher light intensity a greater range and/or a lower susceptibility to interference in the scanning of the environment of the lidar sensor.

According to an example embodiment of the present inventio, in one case, in which the lidar sensor transmits, e.g., a scan line vertically oriented with respect to the horizon, which for scanning the entire field of view of the lidar sensor is deflected horizontally during a scan pass, it may be advantageous to provide a middle region of such a scan line with a higher light intensity than respective edge regions of the scan line in order to illuminate for example objects situated in front like vehicles and/or pedestrians, etc. more than regions near to the ground or regions of the sky. Furthermore, in principle, any deviating or additional areas of interest can also be defined, which can be illuminated at a higher light intensity by a suitable determination by the optical properties of the first microlens arrangement and the second microlens arrangement.

Preferred further developments of the present invention are disclosed herein.

In one advantageous configuration of the present invention, the first sub-beam generated by the first microlens arrangement features a divergence that differs from a divergence of the second sub-beam generated by the second microlens arrangement. Doing so enables superimposed sub-beams to be produced in a particularly simple manner, which have the predefined light intensity distribution in the environment after the superimposition.

In a further advantageous configuration of the present invention, the first axis and the second axis are identical. This makes it possible to achieve an arrangement of the first microlenses and the second microlenses in which the midpoints of all microlenses are on one and the same axis. Alternatively, it is possible that the first axis and the second axis be arranged with respect to one another at a predefined angle and/or at a predefined parallel offset. An angular offset between the two axes makes it possible, for example to achieve deviating optical properties with regard to a main direction of emission of the respective microlens arrangements. In such a case, it is also correspondingly possible that the first microlenses and the second microlenses are designed identically, and the deviating optical properties are produced solely on the basis of the angular offset between the first axis and the second axis. Alternatively, it is possible to achieve the deviating optical properties both by the angular offset and by differently developed first microlenses and second microlenses. The same applies in the case of a parallel offset arrangement of the first axis and the second axis.

According to an example embodiment of the present invention, particularly advantageously, the first microlenses of the first microlens arrangement and/or the second microlenses of the second microlens arrangement feature a predefined overlap along their axes. In other words, it is advantageously possible for the first microlenses to partially interpenetrate towards the first axis, and for the second microlenses to partially interpenetrate towards the second axis. Moreover, it is also possible that one of the first microlenses and one of the second microlenses interpenetrate one another in a contact region of the two microlens arrangements or that they overlap in this region. Alternatively or additionally, the first microlenses of the first microlens arrangement and/or the second microlenses of the second microlens arrangement feature a focal point that is essentially in the region of a curved surface of the microlenses. Preferably, a diameter or a thickness of the respective microlenses corresponds to a respective focal length of the microlenses.

According to an example embodiment of the present invention, it is possible that the first sub-beam and the second sub-beam overlap or do not overlap in one subregion. The term “subregion” is understood to mean a depth range, in particular the remote field of the lidar sensor, in which a scan of the environment of the lidar sensor is particularly relevant or in which objects/targets are predominantly to be expected in the environment. In other words, the first sub-beam and the second sub-beam can be designed to be either disjunctive or overlapping in the subregion to be scanned.

For example, the microlenses of the first microlens arrangement and/or the second microlens arrangement are each essentially spherical in shape. Particularly advantageously, it is possible that the microlenses of the first microlens arrangement and/or the second microlens arrangement be designed in the shape of a spherical disk (also referred to as a spherical layer) and in particular as a spherical disk with point symmetry. A spherical disk is understood to mean a volumetric section of a sphere obtained by two parallel cuts from a sphere.

In a further advantageous configuration of the present invention, the first microlens arrangement and the second microlens arrangement border one another in the longitudinal direction of the respective microlens arrangements. In other words, in this instance, one end of the first microlens arrangement is in contact with one end of the second microlens arrangement, wherein the two axes advantageously form an identical axis, or are arranged at an advantageously obtuse angle to one another, without being restricted thereto.

It is also possible that the lidar sensor according to the present invention, and specifically the fly-eye lens arrangement, comprises a third microlens arrangement having a plurality of identical third microlenses arranged along a third axis, wherein the third microlens arrangement is inserted in a longitudinal direction between the first microlens arrangement and the second microlens arrangement or borders (in a longitudinal direction) an exposed end of the first microlens arrangement or the second microlens arrangement. As a result, it is possible to improve flexibility in generating one or more regions of interest and/or to produce a more precise adjustment of the light intensity distribution with respect to the desired region(s) of interest.

In a further advantageous configuration of the present invention, the third microlens arrangement has the same optical properties as the second microlens arrangement, and the second microlens arrangement borders one end of the first microlens arrangement, while the third microlens arrangement borders the other end of the first microlens arrangement. Based on such a configuration, for example, a particularly high level of eye safety can be achieved in the near field of the lidar sensor.

The lidar sensor according to the present invention is designed, e.g., as a line scanner or as a flash scanner. In addition, the fly-eye lens arrangement can be formed in one piece or multiple pieces.

BRIEF DESCRIPTION OF THE DRAWINGS

Embodiment examples of the present invention are described in detail below with reference to the figures.

FIGS. 4A and 4B show a schematic view of a fly-eye lens arrangement according to a second embodiment of the present invention and a light intensity distribution corresponding thereto.

DETAILED DESCRIPTION OF EXAMPLE EMBODIMENTS

Figures 1, 2:
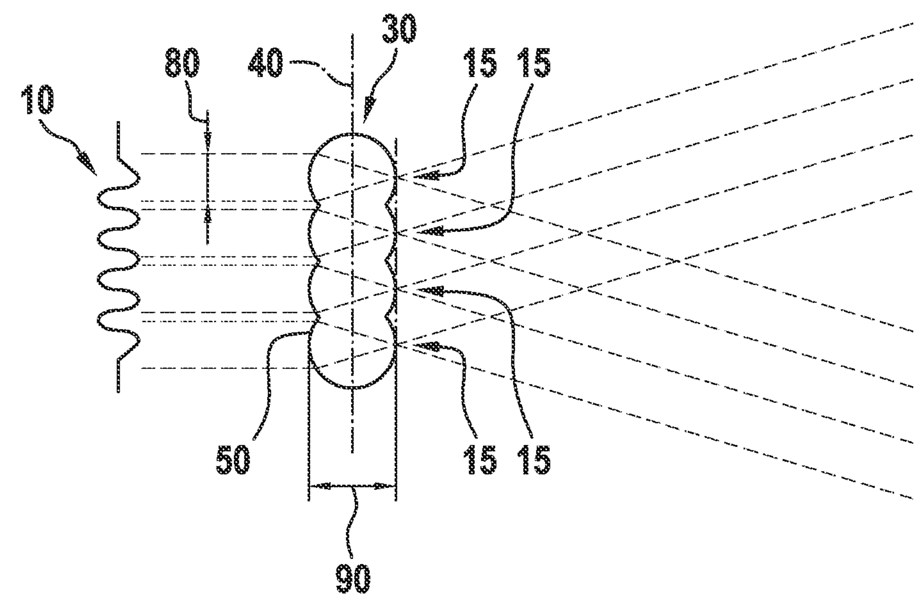
FIG. 1 shows a schematic view of a conventional fly-eye lens arrangement.
FIG. 2 shows a schematic view of a first microlens arrangement and a second microlens arrangement according to the present invention for a fly-eye lens arrangement according to the present invention.

FIG. 1 shows a schematic view of a conventional fly-eye lens arrangement 20 having a plurality of spherical microlenses 50, which are arranged on an axis 40 and form a microlens arrangement 30.

The microlenses 50 are, with respect to their height 80 and width 90, designed such that a light source 10 is imaged in the area of the spherical outer surface of the microlenses 50. Accordingly, a plurality of images 15 of the light source 10 result on the right side (in the figure) of the respective microlenses 50.

In addition, it can be seen that the microlenses 50 partially interpenetrate in the direction of the axis 40 of the microlens arrangement 30 and thus have a predefined overlap.

FIG. 2 shows a schematic view of a first microlens arrangement 30 and a second microlens arrangement 35 according to the invention for a fly eye lens arrangement 20 according to the invention.

The first microlens arrangement 30 comprises a plurality of identical first microlenses 50 stacked along a first axis 40. The second microlens arrangement 35 comprises a plurality of identical second microlenses 55 stacked along a second axis 45, wherein the first microlenses 50 have a greater overlap along the first axis 40 than the second microlenses 55 along the second axis 45.

Accordingly, as can be seen in FIG. 2, a first sub-beam 62 generated by the first microlens arrangement 30 and a second sub-beam 64 generated by the second microlens arrangement 35 results in a deviating divergence when the respective microlens arrangements 30, 35 are illuminated by means of a light source 10. In other words, the first microlens arrangement 30 and the second microlens arrangement 35 each feature different optical properties by virtue of the deviating divergences.

Figure 3A:
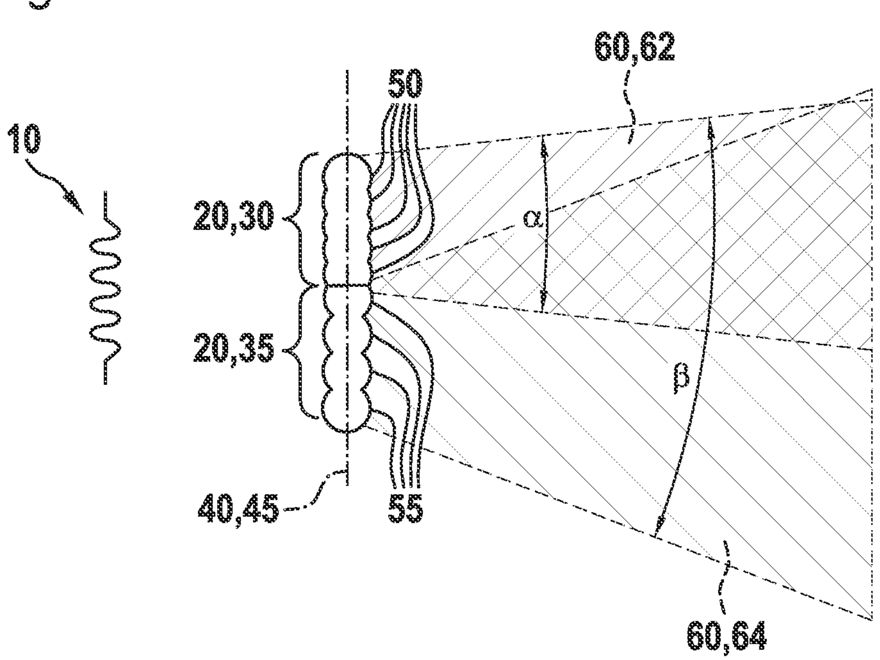
FIGS. 3A and 3B show a schematic view of a fly-eye lens arrangement according to a first embodiment of the present invention and a light intensity distribution corresponding thereto.
Figure 3B:
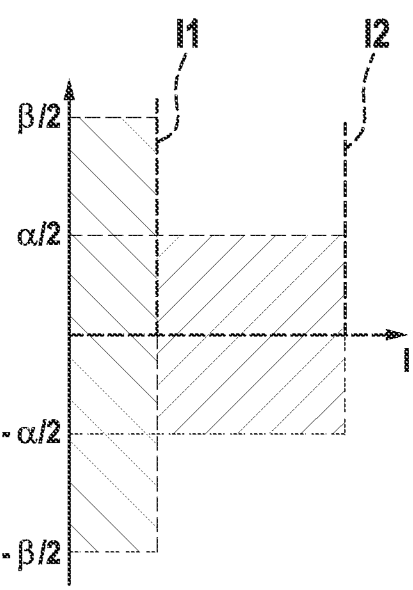

FIGS. 3A and 3B show a schematic view of a fly eye lens arrangement 20 (FIG. 3A) according to a first embodiment of the invention and a light intensity distribution corresponding to said arrangement (FIG. 3B). The fly-eye lens arrangement 20 is advantageously used in a transmission path of a lidar sensor (not shown) of a vehicle (not shown).

The fly-eye lens arrangement 20 is in this case formed from a first microlens arrangement 30 and a second microlens arrangement 35. The first microlens arrangement 30 comprises a plurality of identical first microlenses 50 stacked along a first axis 40, and the second microlens arrangement 35 comprises a plurality of identical second microlenses 55 stacked along a second axis 45, wherein the first axis 40 and the second axis 45 are identical in this embodiment.

By virtue of the varying optical properties of the first microlens arrangement 30 and the second microlens arrangement 35, a first sub-beam 62 generated on the basis of a laser light source 10 and a second sub-beam 64 likewise generated on the basis of the laser light source 10, on the right side (in the figure) of the fly-eye lens arrangement 20, feature different divergences, which are characterized by the angles $\alpha$ and $\beta$.

In an environment, specifically in a remote field of the lidar sensor, which comprises the fly-eye lens arrangement 20 according to the invention, a light intensity distribution of a scanning beam 60 results, as shown in FIG. 3*b*, which is composed of the first sub-beam 62 and the second sub-beam 64. Due to the different divergences of the two sub-beams 62, 64, in regions illuminated only by the first sub-beam 62, a first light intensity I1 results in the remote field of the lidar sensor. Accordingly, in an region in which there is an overlap of the two sub-beams 62, 64, a higher light intensity I2 results in the far field, whereby a greater range of the lidar sensor can be achieved in this region.

This can be advantageously used when, e.g., a central region of a field of view of a lidar sensor is to be captured with a greater range.

Figure 4B:
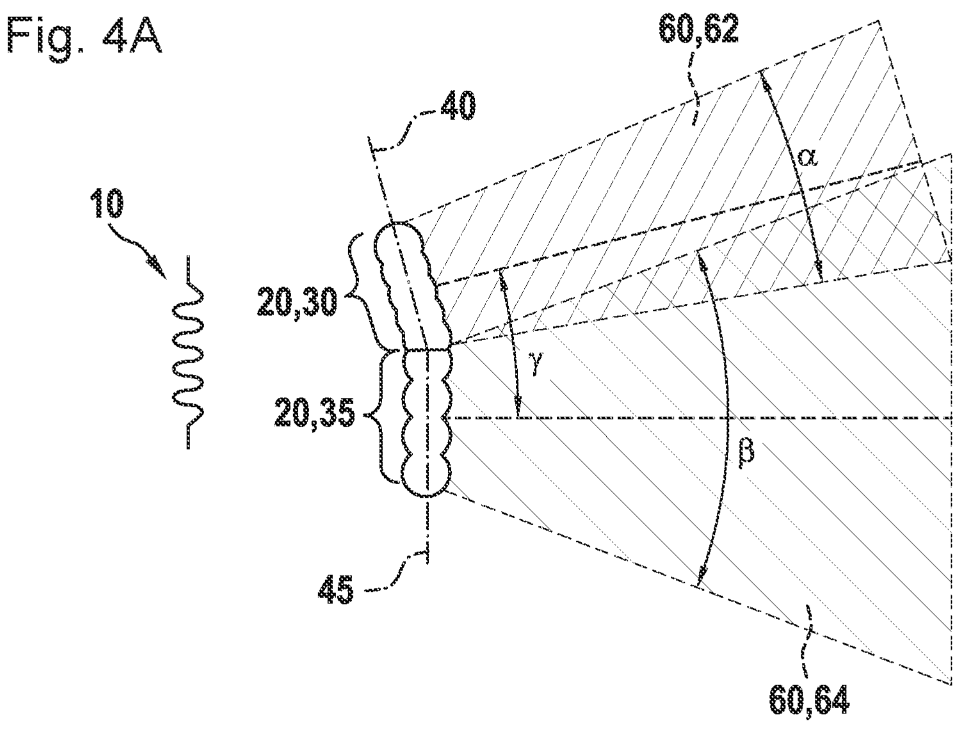

FIGS. 4A and 4B show a schematic view of a fly-eye lens arrangement 20 (FIG. 4A) according to a second embodiment of the invention and a light intensity distribution (FIG. 4B) corresponding thereto. Given the numerous similarities between FIGS. 3A, 4A and FIGS. 3B, 4B, only their differences are described below in order to avoid repetition.

In FIG. 4A, the first axis 40 is arranged at a predefined angle $\gamma$ to the second axis 45. This results in a light intensity distribution of the scanning beam 60, as shown in FIG. 4B, which deviates from the light intensity distribution in FIG. 3B, because the sub-beams 62, 64 are at a different angle, and thereby have a different overlap, with respect to each other.

This is advantageously useful, e.g., if an upper region of a field of view of a lidar sensor is to be detected with a greater range.

Figure 5:
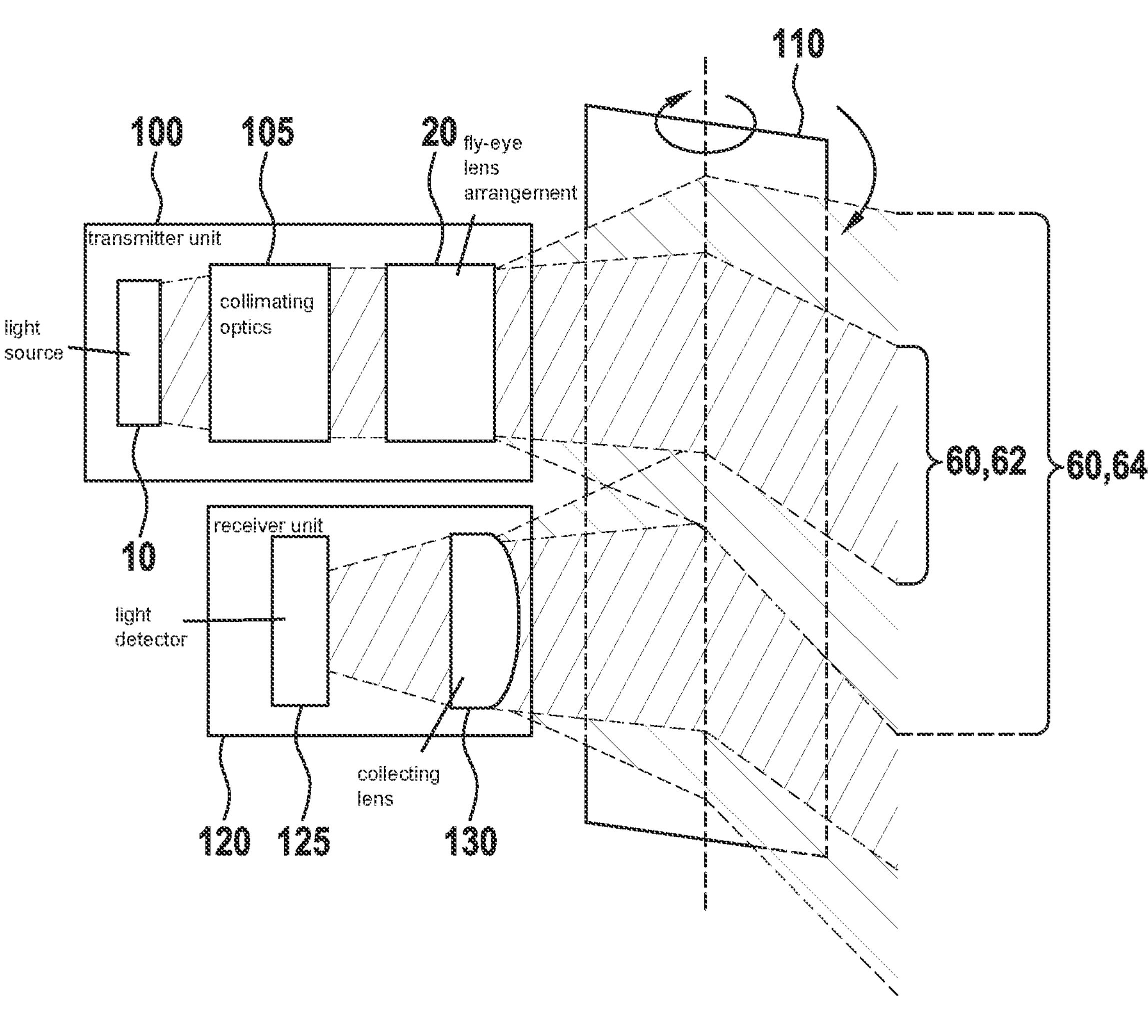
FIG. 5 shows a schematic view of a lidar sensor according to the present invention.

FIG. 5 shows a schematic view of a lidar sensor according to the invention comprising a transmitter unit 100, a deflection unit 110, and a receiver unit 120.

The transmitter unit 100 comprises a light source 10, which is in this case based on a laser diode arrangement. Light generated by the light source 10 is guided via a collimating optics 105 to a fly-eye lens arrangement 20 according to the invention, which generates a scanning beam 60 by means of the light, which is composed of a first sub-beam 62 and a second sub-beam 64.

The scanning beam 60 is deflected via a rotatable deflection unit 110 of the lidar sensor into an environment of the lidar sensor in order to scan the environment.

Components of the scanning beam 60 scattered in the environment are redirected to the receiving unit 120 by means of the deflection unit 110, which comprises a collecting lens 130 and a light detector 125. By means of the light detector 125, it is subsequently possible to detect objects/targets in the environment of the lidar sensor.

Figure 6A:
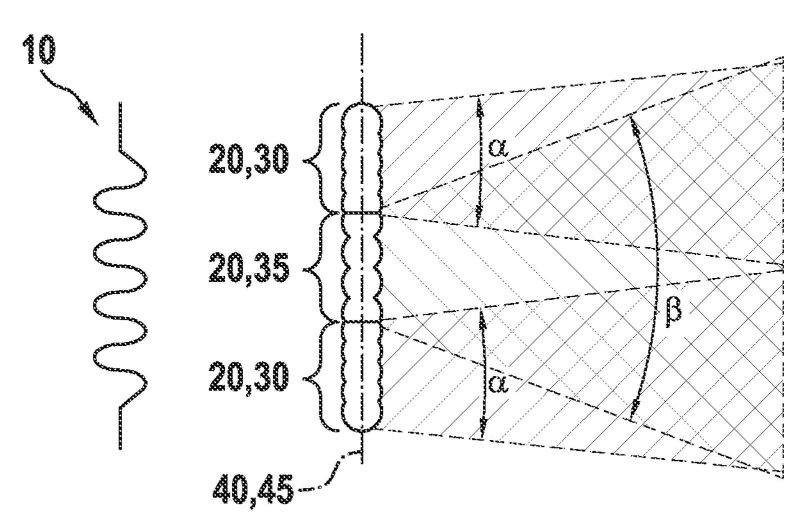
FIGS. 6A and 6B show a schematic view of a fly eye lens arrangement according to a third embodiment of the present invention and a light intensity distribution corresponding thereto.
Figure 6B:
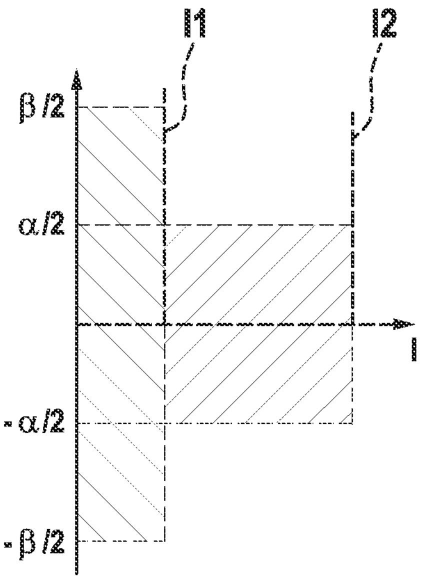

FIGS. 6A and 6B show a schematic view of an inventive fly-eye lens arrangement 20 (FIG. 6A) according to a third embodiment and a light intensity distribution (FIG. 6B) corresponding thereto. Given the numerous similarities between FIGS. 3A, 4A, 6A and FIGS. 3B, 4B, 6B, only their differences are described below in order to avoid repetition.

FIG. 6A shows a fly-eye lens arrangement 20 having a further first microlens arrangement 30 arranged such that the second microlens arrangement 35 is situated in the longitudinal direction between the two first microlens arrangements 30.

A resulting light intensity distribution in the far field essentially corresponds to the light intensity distribution in FIG. 3B. By distributing the light components of the first microlens arrangement 30 in FIG. 3A to two first microlens arrangements 30 in FIG. 6A, the wider distribution of the first sub-beams 62 can in the present third embodiment achieve higher eye safety in a near field (e.g., at a distance of up to a few centimeters or a few meters, starting from an exit opening of the lidar sensor).

Figure 7A:
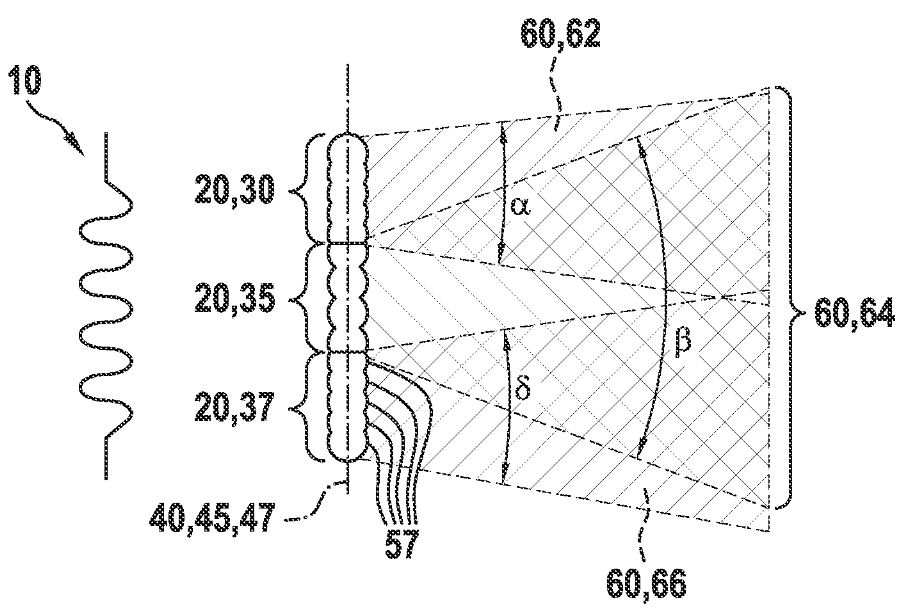
FIGS. 7A and 7B show a schematic view of a fly-eye lens arrangement according to a fourth embodiment of the present invention and a light intensity distribution corresponding thereto.
Figure 7B:
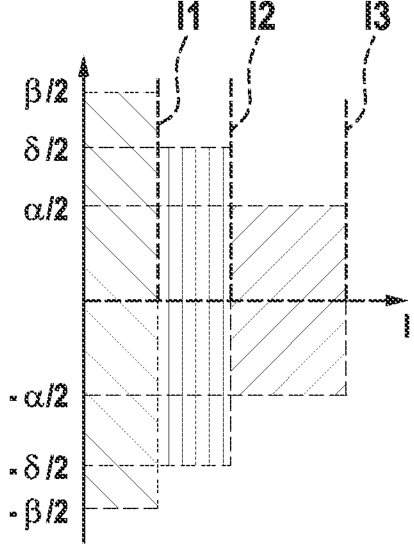

FIGS. 7A and 7B show a schematic view of a fly-eye lens arrangement 20 (FIG. 7A) according to a fourth embodiment of the invention and a light intensity distribution (FIG. 7B) corresponding thereto. Given the numerous similarities between FIGS. 6A, 7A and FIGS. 6B, 7B, only their differences are described below in order to avoid repetition.

Instead of a further first microlens arrangement 30, the fly-eye lens arrangement 20 in FIG. 7A comprises a third microlens arrangement 37 consisting of a plurality of identical third microlenses 57, which are arranged along a third axis 47. The first axis 40, the second axis 45, and the third axis 47 are one and the same axis in this case, deviations from this design also being possible.

The microlens arrangements 30, 35, 37 each differ in at least one optical property, wherein the at least one optical property in each case comprises different divergences of the first sub-beam 62, the second sub-beam 64, and a third sub-beam 66 generated by the third microlens arrangement 66. The divergence of the third sub-beam 66 is indicated by the angle δ.

Based on the configuration described above, it is accordingly possible to generate three regions having different light intensities I1, I2, I3 in the environment.

Figure 8A:
FIGS. 8A and 8B show a schematic view of a fly eye lens arrangement according to a fifth embodiment of the present invention and a light intensity distribution corresponding thereto.
Figure 8A:
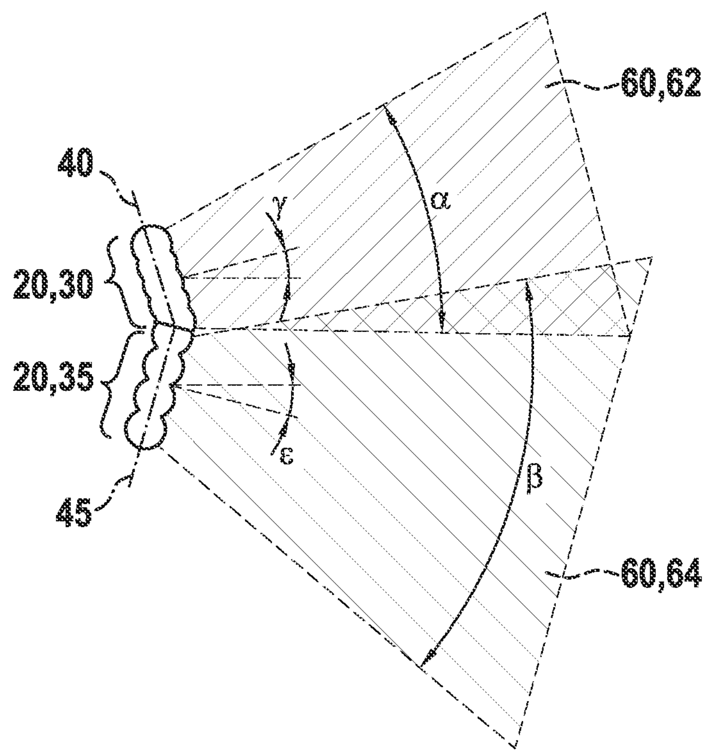
Figure 8B:
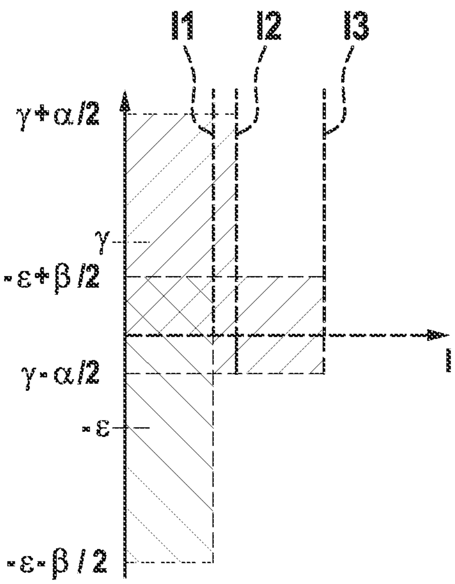

FIGS. 8A and 8B show a schematic view of an inventive fly eye lens arrangement 20 (FIG. 8A) according to a fifth embodiment and a light intensity distribution corresponding thereto (FIG. 8B). Given the numerous similarities between FIGS. 4A, 8A and FIGS. 4B, 8B, only their differences are described below in order to avoid repetition.

Compared to FIG. 4A, FIG. 8A has a greater angular offset between the first axis 40 and the second axis 45 of the respective microlens arrangements 30, 35, which offset results from a partial angle γ and a partial angle ε. This makes it possible to produce in a far field of the lidar sensor (e.g., at a distance of 50 m to 350 m) exclusively an overlap between the first sub-beam 62 and the second sub-beam 64 such that each sub-beam 62, 64, in addition to an overlapping illumination region of the two sub-beams 62, 64, illuminates regions in the far field that are not illuminated by regions of the respective other sub-beam 62, 64.

A light intensity distribution in the far field illustrated in FIG. 8B can be generated therefrom which, as seen in FIG. 7*b*, contains three regions with respective different light intensities I1, I2, I3, which are generated in the fifth embodiment, however, on the basis of only two rather than three microlens arrangements 30, 35.

What is claimed is:

1. A lidar sensor comprising:

a light source; and a fly-eye lens arrangement including a first microlens arrangement and a second microlens arrangement, the first microlens arrangement including a plurality of identical first microlenses stacked along a first axis, and the second microlens arrangement includes a plurality of identical second microlenses stacked along a second axis, wherein the fly-eye lens arrangement is configured to generate, based on a light generated by the light source, a scanning beam for scanning an environment of the lidar sensor, which is composed of a first sub-beam generated by the first microlens arrangement and a second sub-beam generated by the second microlens arrangement, and wherein optical properties of the first microlens arrangement and optical properties of the second microlens arrangement differ from one another to generate the scanning beam having a predefined light intensity distribution;

wherein the optical properties of the first microlens arrangement and the optical properties of the second microlens arrangement that differ from one another include at least one of:

(i) diameters of the first microlenses and diameters of the second microlenses, (ii) thicknesses of the first microlenses and thicknesses of the second microlenses, (iii) curvatures of the first microlenses and curvatures of the second microlenses, or (iv) main direction of emission of the first microlens arrangement and main direction of emission of the second microlens arrangement.

2. The lidar sensor according to claim 1, wherein the first sub-beam generated by the first microlens arrangement has a divergence which differs from a divergence of the second sub-beam generated by the second microlens arrangement.

3. The lidar sensor according to claim 1, wherein the first axis and the second axis are: identical, or arranged with respect to one another at a predefined angle and/or at a predefined parallel offset.

4. The lidar sensor according to claim 1, wherein the first microlenses of the first microlens arrangement and/or the second microlenses of the second microlens arrangement:

feature an overlap along their axes, and/or feature a focal point that is located in a region of a curved surface of the first and/or second microlenses.

5. The lidar sensor according to claim 1, wherein the first sub-beam and the second sub-beam overlap, or do not overlap, in a subregion.

6. The lidar sensor according to claim 1, wherein the first and/or second microlenses of the first microlens arrangement and/or the second microlens arrangement are each: spherical, or a spherical disk with point symmetry.

7. The lidar sensor according to claim 1, wherein the first microlens arrangement and the second microlens arrangement border one another in a longitudinal direction of the first and second microlens arrangements.

8. The lidar sensor according to claim 1, further comprising:

a third microlens arrangement having a plurality of identical third microlenses arranged along a third axis, wherein the third microlens arrangement is inserted in a longitudinal direction:

between the first microlens arrangement and the second microlens arrangement, or borders an exposed end of the first microlens arrangement or the second microlens arrangement.

9. The lidar sensor according to claim 8, wherein:

the third microlens arrangement features the same optical properties as the second microlens arrangement, the second microlens arrangement borders one end of the first microlens arrangement, and the third microlens arrangement borders the other end of the first microlens arrangement.

10. The lidar sensor according to claim 1, wherein:

(i) the lidar sensor is a line scanner or a flash scanner, and/or (ii) the fly-eye lens arrangement is formed as one piece or multiple pieces.

11. The lidar sensor according to claim 1, wherein the optical properties of the first microlens arrangement and the optical properties of the second microlens arrangement includes those optical properties that cause the first sub-beam generated by the first microlens arrangement to have a divergence which differs from a divergence of the second sub-beam generated by the second microlens arrangement.

12. The lidar sensor according to claim 1, wherein the predefined light intensity distribution is a non-uniform light intensity distribution.

* * * * *